US009903418B2

(12) United States Patent
Best et al.

(10) Patent No.: US 9,903,418 B2
(45) Date of Patent: Feb. 27, 2018

(54) COUPLING ADAPTER AND ARRANGEMENT FOR MULTI-POWERTRAIN SYSTEM

(71) Applicant: Caterpillar Inc., Peoria, IL (US)

(72) Inventors: Kurtis M. Best, Wyoming, IL (US); Tobias James Toennies, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 593 days.

(21) Appl. No.: 14/567,579

(22) Filed: Dec. 11, 2014

(65) Prior Publication Data

US 2016/0169291 A1    Jun. 16, 2016

(51) Int. Cl.
| | |
|---|---|
| *F16D 1/08* | (2006.01) |
| *F16D 3/18* | (2006.01) |
| *G01M 1/30* | (2006.01) |
| *F16D 1/10* | (2006.01) |
| *F16D 1/116* | (2006.01) |
| *F16D 3/06* | (2006.01) |

(52) U.S. Cl.
CPC ........... *F16D 1/0876* (2013.01); *F16D 3/185* (2013.01); *G01M 1/30* (2013.01); *F16D 1/116* (2013.01); *F16D 3/06* (2013.01); *F16D 2001/103* (2013.01); *Y10T 403/7033* (2015.01)

(58) Field of Classification Search
CPC ........ F16D 1/076; F16D 1/0876; F16D 1/116; F16D 3/06; F16D 3/50; F16D 3/72; F16D 2001/103; G01M 1/30; Y10T 403/645; Y10T 403/7026; Y10T 403/7028; Y10T 403/7031; Y10T 403/7032; Y10T 403/7033; Y10T 403/7035

USPC .......... 464/162, 172, 177; 403/337, 403/359.1–359.6
See application file for complete search history.

(56) References Cited

U.S. PATENT DOCUMENTS

| 2,592,309 | A | * | 4/1952 | Meier | F16D 3/185 |
| | | | | | 464/154 |
| 2,659,217 | A | * | 11/1953 | Talbot | F16D 3/34 |
| | | | | | 464/154 |
| 2,891,393 | A | * | 6/1959 | Swanson | F16D 3/185 |
| | | | | | 403/291 |

(Continued)

FOREIGN PATENT DOCUMENTS

JP    2014118063    6/2014

OTHER PUBLICATIONS

GEARex® All-Steer Gear Coupling made for Motion KTR article, pp. 1-10.

(Continued)

*Primary Examiner* — Josh Skroupa

(57) ABSTRACT

An adapter for use in a power system having a first powertrain joined to a second powertrain by a coupling. The adapter may have a generally cylindrical body having a central bore formed therein that is configured to receive a shaft of the first powertrain, and splines formed at an end of the central bore. The adapter may also have a connection keyway formed within an outer annular surface of the generally cylindrical body and configured to receive a key that engages the coupling, and a balancing keyway formed within the outer annular surface of the generally cylindrical body and configured to remain empty to balance the coupling.

13 Claims, 2 Drawing Sheets

(56) References Cited

U.S. PATENT DOCUMENTS

| | | | | |
|---|---|---|---|---|
| 2,918,809 | A * | 12/1959 | Miller | F16D 3/185 |
| | | | | 464/154 |
| 2,986,908 | A * | 6/1961 | Wilkerson | F16D 3/185 |
| | | | | 464/154 |
| 3,096,631 | A * | 7/1963 | Seireg | F16D 3/52 |
| | | | | 464/177 |
| 3,132,494 | A * | 5/1964 | Hoffer | F16D 3/185 |
| | | | | 464/154 |
| 3,260,541 | A * | 7/1966 | Sadler | A01B 71/06 |
| | | | | 403/325 |
| 3,757,535 | A * | 9/1973 | Stein | F16D 3/185 |
| | | | | 184/6.11 |
| 4,881,921 | A * | 11/1989 | Pokrandt | F16D 3/52 |
| | | | | 464/147 |
| 4,911,678 | A * | 3/1990 | Quirk | F16D 3/185 |
| | | | | 464/154 |
| 5,688,067 | A * | 11/1997 | Straub | E21B 43/121 |
| | | | | 403/300 |
| 7,775,779 | B2 * | 8/2010 | Sheth | F04D 13/022 |
| | | | | 403/300 |
| 2004/0038557 | A1 | 2/2004 | Mattern et al. | |
| 2008/0035595 | A1 | 2/2008 | Kanjo | |
| 2009/0101615 | A1 | 4/2009 | Krome | |
| 2012/0068437 | A1 | 3/2012 | Kobert et al. | |

OTHER PUBLICATIONS http://en.relocsa.ro/communicate-de-presa/caterpillar-helps-revive-diesel-mechanical-locomotive-production-in-romania, Caterpillar © 2014 (printed Dec. 11, 2014)

* cited by examiner

COUPLING ADAPTER AND ARRANGEMENT FOR MULTI-POWERTRAIN SYSTEM

TECHNICAL FIELD

The present disclosure relates generally to a coupling adapter and arrangement and, more particularly, to a coupling adapter and arrangement for a multi-powertrain power system.

BACKGROUND

Large mobile machines, for example locomotives, can operate in many different applications. In some of these applications, for example in switching applications, traction and power can be important factors. A typical switching locomotive includes a single engine connected to drive all available axles by way of a mechanical transmission. By driving all of the axles, a desired level of traction can be achieved by the switching locomotive.

While the use of multiple driven axles by a switching locomotive may provide the desired level of traction, there may be times when the single engine of the locomotive does not provide enough power. In these situations, a different locomotive having a larger engine may be utilized.

A problem still arises, however, in applications that periodically require low power and high power. In particular, the locomotive having the single smaller engine can provide the required low level of power, but not the high level of power. Likewise, the locomotive having the larger engine can provide the high level of power, but is inefficient at providing the low level of power. Thus, in a typical train yard, two different types of locomotives are required in order to satisfy the varying levels of power found in common situations.

The present disclosure is directed at overcoming one or more of the shortcomings set forth above and/or other problems of the prior art.

SUMMARY

In one aspect, the present disclosure is directed to an adapter for a power system having a first powertrain and a second powertrain joined together by a coupling. The adapter may include a generally cylindrical body having a central bore formed therein that is configured to receive a shaft of the first powertrain, and splines formed at an end of the central bore. The adapter may also have a connection keyway formed within an outer annular surface of the generally cylindrical body and configured to receive a key that engages the coupling, balancing keyway formed with in the outer annular surface of the generally cylindrical body and configured to remain empty to balance the coupling.

In another aspect, the present disclosure is directed to another adapter for a power system having a first powertrain and a second powertrain joined together by a coupling. This adapter may include a generally cylindrical body having a central bore formed therein that is configured to receive a shaft of the first powertrain, and engagement features formed at an end of the central bore and configured to engage corresponding features of the shaft. The adapter may also include a locking element formed within an outer annular surface of the generally cylindrical body and configured to rotationally constrain the coupling, and a groove formed in the outer annular surface and configured to receive a retaining clip that positions the coupling.

In yet another aspect, the present disclosure is related to a coupling arrangement for a power system having a first powertrain and a second powertrain. The coupling arrangement may include a first adapter configured to engage a shaft of the first powertrain, and a second adapter configured to engage a shaft of the second powertrain. The coupling arrangement may further include a coupling configured to connect the first adapter to the second adapter.

DETAILED DESCRIPTION

Figure 1:
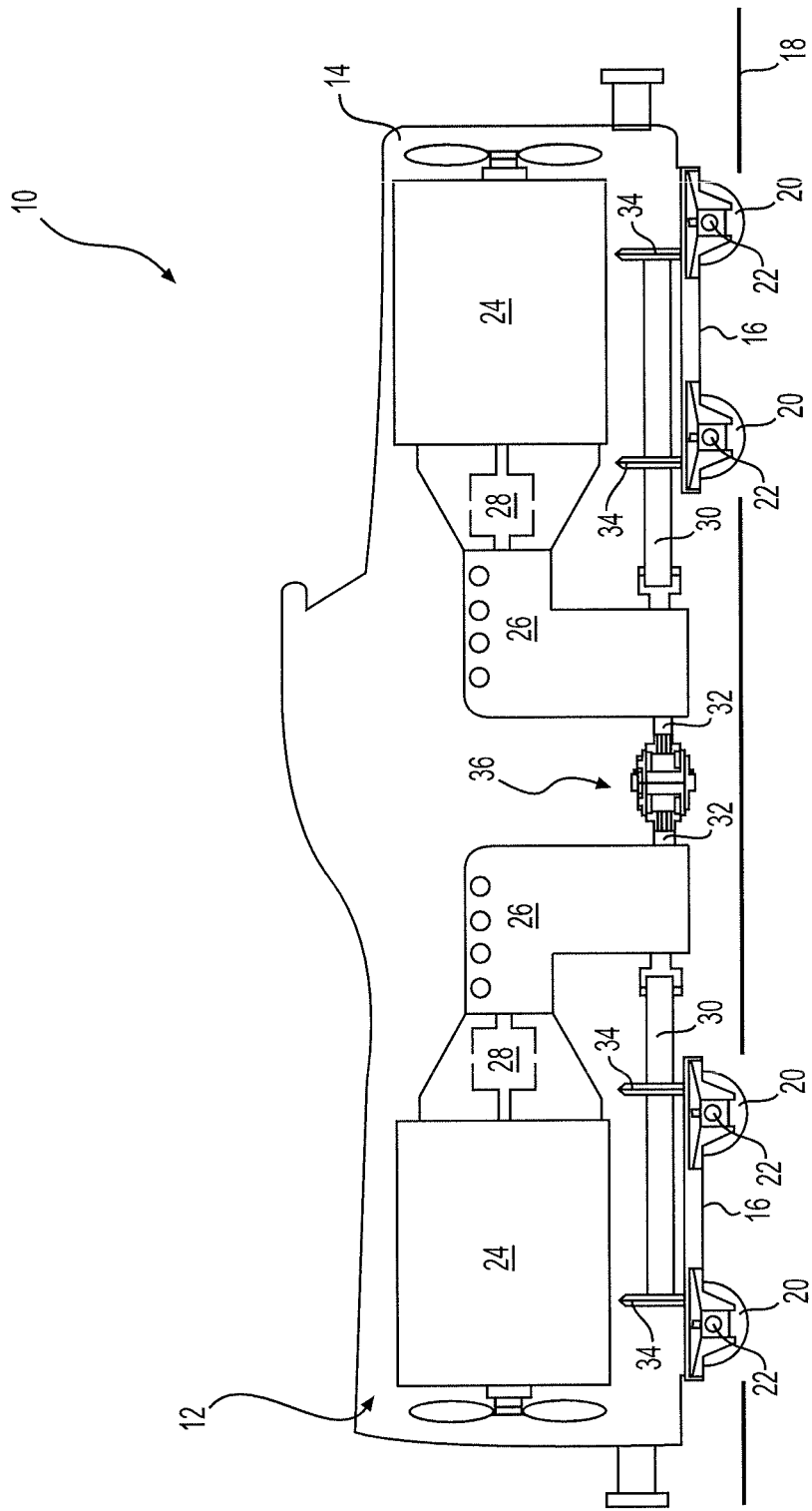
FIG. 1 is a diagrammatic illustration of a locomotive equipped with an exemplary disclosed power system.

FIG. 1 illustrates a mobile machine 10 equipped with an exemplary power system 12. In the disclosed example, machine 10 is a locomotive (e.g., a switching locomotive). However, it is contemplated that machine 10 may embody another type of machine, if desired. As a locomotive, machine 10 may include a car body 14 supported at opposing ends by a plurality of trucks 16 (e.g., one truck 16 at each end). Each truck 16 may be configured to engage a track 18 via a plurality of wheels 20 (e.g., four wheels 20 per truck 16), with wheels 20 being arranged in pairs that are mounted on a common axle 22. One or more final drives (e.g., a pinion gear—not shown) may be associated with each or both axles 22 of a particular truck 16, and power system 12 may be mounted within car body 14 and drivingly connected to wheels 20 via axles 22 and the final drives. In the disclosed example, power system 12 is configured to drive all wheels 20 of machine 10. In other examples, power system 12 may be configured to drive some, but not all wheels 20 of each truck 16. For example, power system 12 could be connected via the final drives to a single axle 22 (i.e., only two wheels 20) within each truck 16, if desired.

Power system 12 may include two engines 24 oriented in opposition to each other, and a transmission 26 connected to an inboard end of each engine 24 by way of a torque converter 28. For the purposes of this disclosure, each engine 24, together with its connected transmission 26 and torque converter 28 may be considered a separate powertrain. Power system 12 may also include an outwardly extending drive shaft 30 connecting each powertrain to the final drive of a corresponding truck 16, and an inwardly extending drive shaft 32. Drive shafts 30 may connect to the final drives of trucks 16 in any manner known in the art, for example by way of bevel gears 34. A coupling arrangement 36 may be used to couple drive shafts 32 to each other. With this configuration, any one or both of the powertrains may be selectively operated to simultaneously drive one or more axles 22 within each truck 16. It is contemplated that the powertrains may have the same output capacity or different capacities, as desired. In this manner, multiple levels of power may be generated and used to simultaneously drive at least one axle 22 (all axles 22 in the disclosed embodiment) of both trucks 16.

Figure 2:
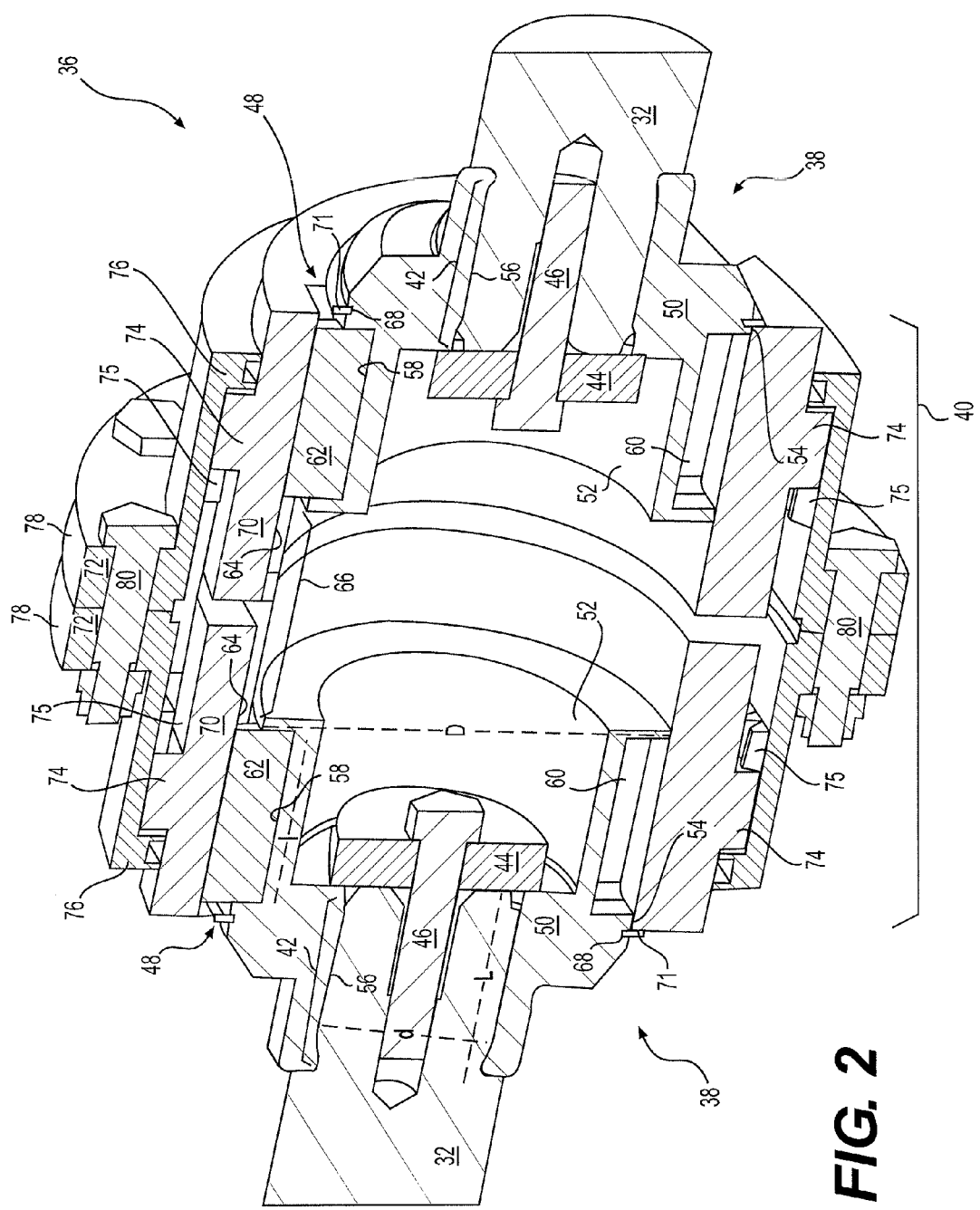
FIG. 2 is a cross-sectional illustration of an exemplary disclosed coupling arrangement that may be used in conjunction with the power system of FIG. 1.

FIG. 2 illustrates an exemplary coupling arrangement 36. Coupling arrangement 36 may be an assembly of components, including an adapter 38 connected to the distal end of each drive shaft 32, and a coupling 40 configured to join the two adapters 38 to each other. Each adapter 38 may be rigidly connected to its corresponding drive shaft 32 by way a splined interface 42, a retainer 44, and a fastener (e.g., a bolt) 46 passing through retainer 44 into an end of driveshaft 32. Coupling 36 may be connected to adapters 38 by way of a keyed joint 48 in such a way that torque may be transferred between drive shafts 32 while also allowing some axial movement and/or misalignment.

Adapter 38 may include a generally cylindrical body 50 having a stepped central bore 52 and a similarly stepped outer annular surface 54. A smaller diameter end of bore 52 may include internal splines 56 that are configured to receive corresponding external splines of shaft 32 at interface 42. A larger diameter end of annular surface 54 (i.e., an axial end opposite splines 56) may include one or more keyways, for example a connection keyway 58 and a balancing keyway 60. In the disclosed embodiment, the geometries of connection and balancing keyways 58, 60 are substantially identical. In other embodiments, however, the geometries may be different, if desired.

Connection keyway 58 may be configured to receive a key 62 that is also received by an aligned slot 64 in coupling 40, thereby constraining a rotation of adapter 38 to a rotation of coupling 40. Balancing keyway 60 may be located at a side of body 50 opposite connection keyway 58 and remain empty during operation, in order to correct an imbalance caused by an empty end of slot 64 (i.e., an open space 66 within slot 64 not filled by keys 62) in coupling 40. An axial clearance may be maintained between adapters 38 within coupling 40 to facilitate assembly, the axial clearance resulting in open space 66 within slot 64.

It should be noted that engagement features other than splines 56 could alternatively be used to connect adapters 38 to drive shafts 32, if desired. Similarly, locking elements other than keys 62 could be used to rotationally constrain adapters 38 and coupling 40.

A groove 68 may be formed within outer annular surface 54. Groove 68 may be axially located between internal ends of splines 56 and keyways 58, 60. As will be described in more detail in the following section, a retaining clip 71 may be assembled into each groove 68 to axially position coupling 40 relative to adapters 38.

Dimensions of adapters 38 may be selected to provide unique properties for application of coupling arrangement 36 to the railroad industry. In particular, a ratio of a spline pitch diameter d relative to an outer diameter D of the larger diameter end of outer annular surface 54 may be about (e.g., within manufacturing tolerances) 1:1.6-2.8. In addition, the lengths l of keyways 58, 60 may be about the same and shorter than a length L of splines 56. These dimensional relationships may provide for a desired connection strength of adapters 38 and also a desired degree of flexibility in the connections. Deviations from these relationships could result in weak connections and/or connections that are too stiff or too loose for a required longevity of coupling arrangement 36.

Coupling 40 may generally consist of four main parts, including first and second inner rings 70 and first and second outer rings 72. Inner rings 70 may each be generally cylindrical, having slot 64 formed at an inside surface, and intermeshing gear teeth 74 located at an outer surface. Gear teeth 74 may be configured to engage corresponding gear teeth 75 in outer rings 72, thereby rotationally locking the rings 70, 72 together. In the disclosed embodiment, gear teeth 74 and 75 are of a crowned type, configured to allow some axial misalignment between inner and outer rings 70, 72 without disruption of torque transfer. Each outer ring 72 may also be generally cylindrical, having a lip 76 formed at an outside end that axially engages the corresponding inner ring 72, and a flange 78 formed at an inside end that mates against flange 78 from the other outer ring 72. A plurality of fasteners 80 may pass through flanges 78 to connect outer rings 72 to each other, thereby substantially enclosing inner rings 70 and adapters 38.

Outer rings 72 may be axially positioned relative to inner rings 70 by way of lips 76 and fasteners 80. However, coupling 40 may still be allowed to move axially with respect to adapters 38. Retaining clips 71, being disposed at the opposing ends of coupling 40 within grooves 68, may limit this movement and thereby axially position coupling 40.

INDUSTRIAL APPLICABILITY

The coupling arrangement of the present disclosure may be applicable to any machine where joining of multiple powertrains may be helpful. The disclosed coupling arrangement finds particular application within the railroad industry, for example within switching locomotives where variable power and traction is required. The disclosed coupling arrangement may allow for two powertrains to be coupled together, and for one or both of the powertrains to simultaneously drive axles and wheels within multiple trucks. Assembly of the disclosed coupling arrangement will now be described in detail.

To begin assembly of coupling arrangement 36, the distal ends of shafts 32 need to be positioned and aligned relative to each other within specified tolerances. Retaining clips 71 may then each be slid over the end of a corresponding shaft 32. One key 62 may be inserted into connection keyway 58 of each adapter 38, and inner ring 70 may be slide over each adapter 38. Outer rings 72 may then be slid over inner rings 70, in the direction from small to large diameter portions of the corresponding adapters 38 (with gear teeth 74 and 75 intermeshed), until lips 76 engage the outer ends of gear teeth 74.

One of the subassemblies of adapter 38, inner ring 70, and outer ring 72 may then be slid over the end of one of shafts 32, with corresponding splines 56 of adapter 38 and shaft 32 engaged. Retainer 44 may then be placed against the end of the shaft 32, and fastener 46 passed through retainer 44 and tightened into shaft 32. At this point in time, adapter 38 may be rigidly connected to shaft 32 via mechanical interference with retainer 44, but the associated inner and outer rings 70, 72 may still be able to slide in an axial direction.

The remaining subassembly of adapter 38, inner ring 70, and outer ring 72 may then be slid over the end of the remaining shaft 32, with corresponding splines 56 of adapter 38 and shaft 32 engaged. The reaming retainer 44 may then be placed against the end of the shaft 32, and the remaining fastener 46 passed through retainer 44 and tightened into shaft 32. The two subassemblies may then be pushed inward, until flanges 78 mate against each other. Fasteners 80 may then be inserted through holes in flanges 78 and tightened to connect the two subassemblies to each other. Retaining clips 71, which were previously installed on shafts 32, may now be inserted into the respective grooves 68 of each adapter 38 to thereby position and inhibit outward axial movement of coupling 40.

Because the disclosed system may allow each of the powertrains to separately or together drive axles 22 of both trucks 16, more axles 22 may be driven, resulting in greater traction. In addition, the disclosed coupling arrangement may provide multiple levels of power output.

It will be apparent to those skilled in the art that various modifications and variations can be made to the coupling adapter and arrangement of the present disclosure without departing from the scope of the disclosure. Other embodiments will be apparent to those skilled in the art from consideration of the specification and practice of the coupling adapter and arrangement disclosed herein. It is intended that the specification and examples be considered as exemplary only, with a true scope of the disclosure being indicated by the following claims and their equivalents.

What is claimed is:

1. An adapter for a power system having a first powertrain joined to a second powertrain by a coupling, the adapter comprising:
    a generally cylindrical body having a central bore formed therein that is configured to receive a shaft of the first powertrain;
    splines formed at an end of the central bore;
    a connection keyway formed within an outer annular surface of the generally cylindrical body and configured to receive a key that engages the coupling; and
    a balancing keyway formed within the outer annular surface of the generally cylindrical body and configured to remain empty to balance the coupling.

2. The adapter of claim 1, wherein the outer annular surface of the generally cylindrical body is stepped, and the connection and balancing keyways are formed in a larger diameter portion of the outer surface.

3. The adapter of claim 1, wherein the connection and balancing keyways are formed at an axial end of the generally cylindrical body opposite the splines.

4. The adapter of claim 1, wherein the connection keyway is formed at a side of the generally cylindrical body opposite the balancing keyway.

5. The adapter of claim 1, wherein a ratio of a pitch diameter of the splines to a diameter of the outer annular surface is 1:1.6-2.8.

6. The adapter of claim 1, wherein:
    a length of the connection keyway is equal to a length of the balancing keyway; and
    the length of the connection keyway is less than a length of the splines.

7. The adapter of claim 1, further including a groove formed in the outer annular surface and configured to receive a retaining clip that positions the coupling.

8. The adapter of claim 7, wherein the groove is located axially between internal ends of the splines and the connection keyway.

9. A coupling arrangement for a power system having a first powertrain and a second powertrain, the coupling arrangement comprising:
    a first adapter configured to engage a shaft of the first powertrain;
    a second adapter configured to engage a shaft of the second powertrain; and
    a coupling configured to connect the first adapter to the second adapter, the coupling comprising:
        a first outer ring;
        a second outer ring;
        a first inner ring keyed to the first adapter, received within the first outer ring, and rotationally locked to the first outer ring;
        a second inner ring keyed to the second adapter, received within the second outer ring, and rotationally locked to the second outer ring; and
        a plurality of fasteners axially connecting the first and second outer rings;
    wherein the first and second outer rings are rotationally locked to the first and second inner rings, respectively, by way of intermeshing gear teeth, the intermeshing gear teeth being crowned to allow misalignment of the shafts of the first and second powertrains.

10. The coupling arrangement of claim 9, wherein:
    each of the first and second inner rings includes a key slot;
    each of the first and second adapters includes a keyway; and
    the coupling arrangement further includes a key disposed within the keyway of each of the first and second adapters,
    wherein a length of the key slot is greater than a length of the key.

11. The coupling arrangement of claim 10, wherein:
    the keyway of the first and second adapters is a connection keyway; and
    each of the first and second adapters further includes a balancing keyway located at an opposite side relative to the connection keyway, the balancing keyway configured to correct an imbalance caused by a difference of the length of the key slot and the length of the key.

12. The coupling arrangement of claim 11, wherein the first and second adapters are splined to the shafts of the first and second powertrains, respectively.

13. The coupling arrangement of claim 12, wherein:
    each of the first and second adapters includes a groove formed in an outer annular surface at an axial location between internal spline ends and the connection keyway; and
    the coupling arrangement further includes a retaining clip disposed within the groove and configured to axially position the first and second outer rings.

* * * * *